W. PFLEEGER.
SUPPLEMENTAL HOLDING DEVICE FOR MOTOR VEHICLES.
APPLICATION FILED JAN. 10, 1919.
1,303,110.
Patented May 6, 1919.
2 SHEETS—SHEET 1.
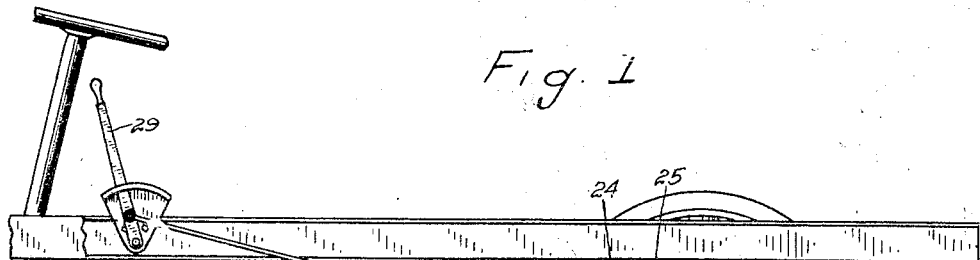
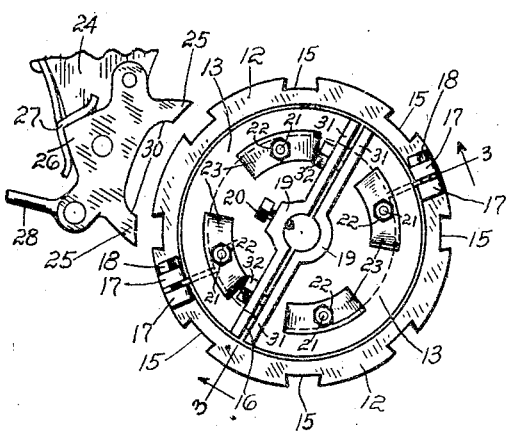
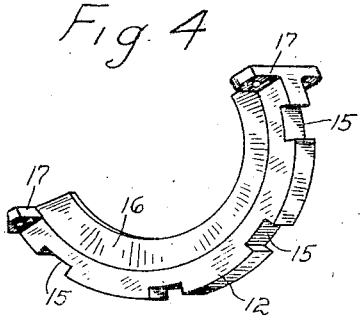
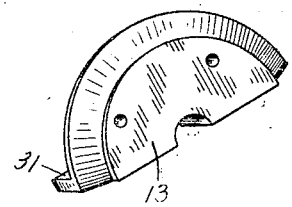
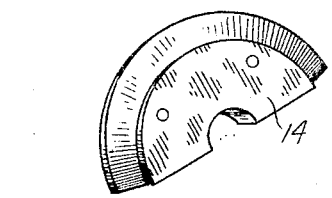
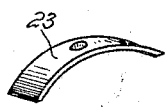
INVENTOR
William Pfleeger
BY
ATTORNEY

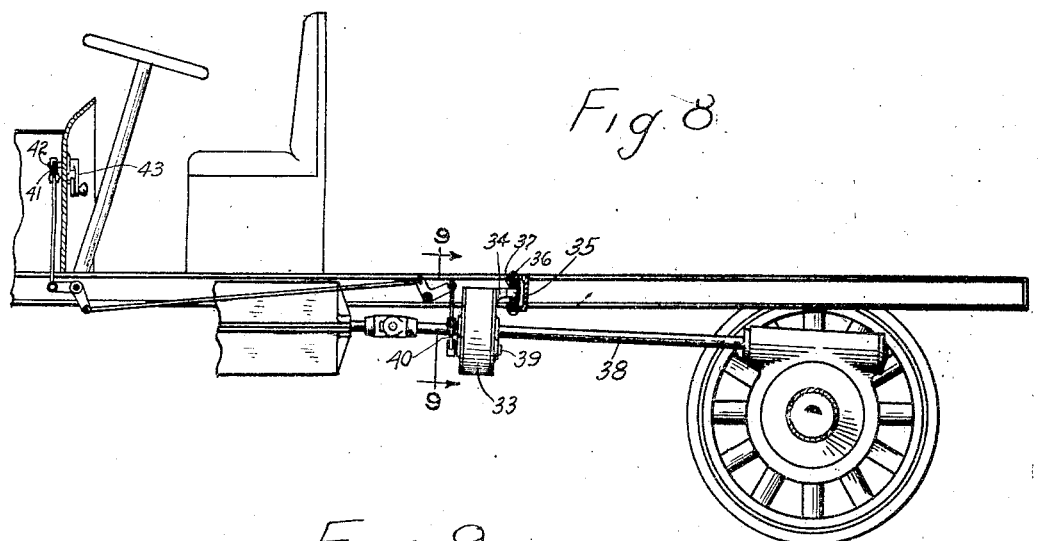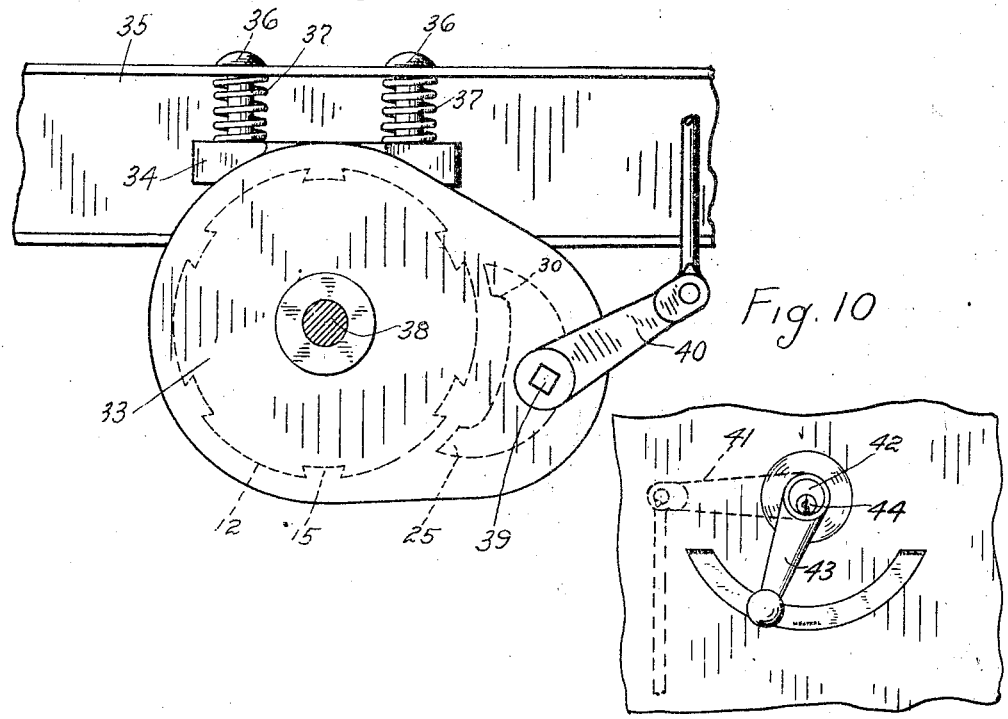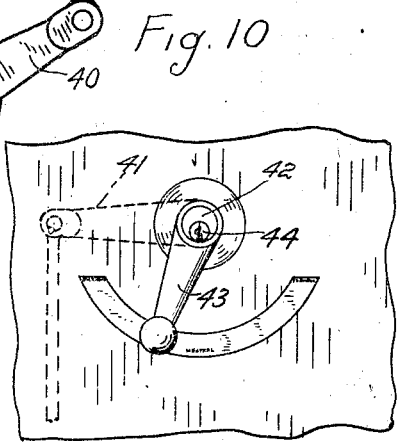

UNITED STATES PATENT OFFICE.

WILLIAM PFLEEGER, OF NORWALK, CONNECTICUT.

SUPPLEMENTAL HOLDING DEVICE FOR MOTOR-VEHICLES.

1,303,110.　　　　Specification of Letters Patent.　　Patented May 6, 1919.

Application filed January 10, 1919. Serial No. 270,608.

*To all whom it may concern:*

Be it known that I, WILLIAM PFLEEGER, a citizen of the United States, residing at Norwalk, county of Fairfield, State of Connecticut, have invented an Improvement in Supplemental Holding Devices for Motor-Vehicles, of which the following is a specification.

This invention has for its object to provide a locking or holding device for shafts and axles which is especially adapted for use as a supplement to the brakes upon heavy motor cars and trucks, and which will securely hold the vehicle against movement down hill, no matter which way it may be headed, should the brakes fail to work, or may be used to render assurance doubly sure should it be required that the vehicle stand for any length of time or that the driver leave his seat. My novel holding device may be applied to wheel carrying axles, or to propeller shafts, so called, or to jack shafts forming a part of the driving mechanism, the device consisting of few parts, all inexpensive to make and easy to assemble, and being practically impossible to get out of repair.

With these and other objects in view I have devised the novel holding device which I will now describe referring to the accompanying drawings forming a part of this specification and using reference characters to indicate the several parts.

Figure 1 is a fragmentary view showing in elevation so much of the chassis of a motor truck as is necessary to illustrate the application to a rear axle of my novel holding device, the axle being in section, the wheel being supposed to be fixed thereto, and the pawl being in locking engagement with the ratchet;

Fig. 2 is an elevation, on an enlarged scale, of the holding device detached the pawl being disengaged from the ratchet;

Fig. 3 is a section on the line 3—3 in Fig. 2, looking in the direction of the arrows;

Figs. 4, 5, 6, and 7 are perspective views of members of the ratchet disassembled;

Fig. 8 is a view similar to Fig. 1, showing the holding device inclosed in a case and applied to the propeller shaft of a motor truck;

Fig. 9 is a section, on an enlarged scale, on the line 9—9 in Fig. 8, and

Fig. 10 is a fragmentary view showing a form of a controlling mechanism provided with a lock, in elevation.

In the application of the invention illustrated in Fig. 1, 10 denotes a rear axle of a motor truck and 11 one of the rear wheels. The essential features of the invention are an easily attached composite ratchet, a double toothed pawl, and suitable means for throwing the pawl into and out of locking engagement with the ratchet. The ratchet comprises two rim members, indicated by 12, two body members, indicated by 13, and two other body members, indicated by 14. The rim members are provided with peripheral notches 15, the ends of which are angular and may or may not be slightly undercut, on their inner sides with V-shaped webs 16, and at their ends with flanges 17. The corresponding flanges at the respective ends of the rim members are adjustably secured together by bolts 18 which pass through one of the flanges and engage the other. Body members 13 are provided with hub flanges 19, one of which is locked to the axle by a set screw 20, and with diametrical flanges 31. Body members 13 are adjustably secured together by bolts 32 which pass through one of the flanges 31 and engage the other. The inner edges of body members 13 and 14 are beveled at an angle to correspond with the angle of webs 16 on the rim members. Body members 13 and 14 are locked to each other and the rim members are locked in place between them by bolts 21 which pass through the body members and are provided with nuts 22, springs 23 being interposed between the heads of the bolts, and the nuts, and the respective body members. This construction enables me to effect any adjustment of the rim members that may be found necessary in assembling, and to compensate for wear after long continued use.

The pawl is pivoted to a suitable bracket, as at 24, is provided with an engaging tooth 25 at each end, and on its top with a boss 26 which is adapted to be engaged by a spring 27, shown as secured to the bracket, and suitably shaped to coöperate with the boss and normally retain the pawl in the disengaged position, as in Fig. 2. The walls of the engaging teeth opposite the engaging angles are beveled or curved to form disengaging walls 30, so that when a vehicle which is headed up hill is started forward, after being locked, the projecting rear angle of the engaged notch in the ratchet will engage the corresponding wall 30 of the pawl and throw the pawl out of engagement with the notch independently of the pawl operating means, in which position it will be retained by spring 27, as in Fig. 2. If the vehicle has been headed down hill backward movement thereof will cause an angle of the engaged ratchet notch to throw the pawl out of engagement with the ratchet, in which position it will be retained by the spring as before.

The special manner in which the pawl is operated and caused to engage the ratchet is not an essential part of the invention. In Fig. 1 I have shown the pawl as operated by means of a rod 28, one end of which is operatively connected to the pawl and the other to an operating lever 29, which is conveniently placed for control by the driver. In the form illustrated in Figs. 8, 9 and 10 the holding device is shown as applied to the propeller shaft of a truck, indicated by 38, instead of to a rear axle. The holding device is inclosed in a case 33 provided with a bracket 34 which is secured to a cross piece 35 of the frame of the chassis. Bolts 36 are rigidly secured in angle flanges of the cross piece and pass loosely through the bracket. Springs 37 are preferably interposed between the bracket and the angle flanges to take up road shocks and the vibration of the propeller shaft. The ratchet is secured to the shaft in any suitable manner, as by means of a set screw, as shown in Fig. 2. The pawl is rigidly secured to a shaft 39 mounted to oscillate in the case and carrying an arm 40 which is connected by means of rods and bell crank levers with an arm 41 on an operating shaft 42, mounted to oscillate in any convenient place, ordinarily on the instrument board. This shaft is provided with an operating arm 43 and with suitable locking mechanism, indicated by 44, so that the operating shaft and consequently the pawl shaft and pawl can be locked in either of its holding positions, that is so as to hold the vehicle when headed either up hill or down hill, thus supplementing or doing away with other locking mechanism for a truck or car. The operation will be obvious from the drawing. Suppose the vehicle to be headed down hill should the brakes fail to act effectively or should it be required to leave the vehicle standing, the operating lever would be swung forward, as in Fig. 1, which would throw the upper engaging tooth of the pawl, (as seen in Fig. 1) into engagement with the ratchet, and effectually lock the vehicle against forward movement. Should the vehicle be headed up hill and the brakes fail to operate effectively or it be required to leave the vehicle standing, the operating lever woould be pulled backward which would throw the lower engaging tooth of the pawl into engagement with the ratchet and lock the vehicle against backward movement just as effectively.

Having thus described my invention, I claim:

1. A device of the character described comprising a ratchet having angular notches, a pawl having oppositely acting teeth and a boss, a spring engaging the boss to retain the pawl out of engagement with the ratchet, and means for placing either tooth in engagement with the ratchet.

2. A device of the character described comprising a composite ratchet consisting of ring members having angular notches, flanges by which they are connected together, and V-shaped webs, body members having hub flanges for attachment to a shaft or axle, and edges beveled to correspond with the web, other body members having corresponding bevels, and bolts which secure the body members to each other and adjustably secure the rim members in place, a pawl having oppositely acting teeth which engage the notches, and means for placing either tooth in engagement with a notch.

3. A composite ratchet consisting of two rim members having V-shaped webs, angular notches, flanges at their ends and bolts by which they are adjustably secured together, body members having edges beveled to correspond with the web, hub flanges for attachment to a shaft or axle, diametrical flanges and bolts by which they are adjustably secured together, other body members having corresponding bevels, bolts passing through complementary body members and having nuts, and springs between the heads of the bolts and nuts and the body members, whereby said body members are adjustably secured together and the rim members are adjustably secured in place.

In testimony whereof I affix my signature.

WM. PFLEEGER.